United States Patent Office 3,174,946
Patented Mar. 23, 1965

3,174,946
POLY ALPHA OLEFINS STABILIZED WITH CYCLO-
HEXYL PHENOLS AND DIALKYL DISULFIDES
Jan van Schooten, Amsterdam, Netherlands, assignor to
Shell Oil Company, New York, N.Y., a corporation of
Delaware
No Drawing. Filed June 6, 1961, Ser. No. 115,097
Claims priority, application Netherlands, June 10, 1960,
252,486
3 Claims. (Cl. 260—45.95)

This invention relates to an improved process for the stabilization of polymeric materials. More particularly, the invention relates to an improved process for the stabilization of polymers of ethylenically unsaturated hydrocarbons.

Specifically, the invention provides a process for the stabilization of polymers of ethylenically unsaturated hydrocarbons, especially polymers or copolymers of the mono-olefins, such as, for example, ethylene, propylene, butylene, and the like, particularly against thermal degradation, which comprises the addition of monophenols in which at least two ring carbon atoms are bound to separate hydrocarbon radicals, at least one of these radicals being a monocyclic aliphatic hydrocarbon radical which is bound with a tertiary ring carbon atom to a ring carbon atom of the phenol, in combination with an organic polysulfide. The invention also provides for stabilized polymeric products.

Polymers of ethylenically unsaturated hydrocarbons generally exhibit degradation when processed or stored with resulting deterioration of properties. In order to inhibit and suppress this undesirable degradation and consequent changes in properties, certain compounds called stabilizers are added thereto.

It is known that polymers of ethylenically unsaturated hydrocarbons may be stabilized by the addition of certain monophenols of which at least two ring carbon atoms are bound to separate hydrocarbon radicals and in which at least one of these radicals is a bicyclic cyclo-aliphatic radical derived from a terpene.

Thus, polyethylene produced by Ziegler catalysts at low pressure has been stabilized by the addition of mono-nuclear monophenols in which one or more cyclic terpene radicals is or are substituted. The cyclic terpenes are mono-, bi- or tricyclic cyclo-aliphatic hydrocarbons of which the total number of carbon atoms is 10. The monocyclic terpenes consist of a cyclo-aliphatic ring of 6 carbon atoms, to which ring are bound acyclic hydrocarbon radicals having less than 4 carbon atoms. The bi- and tricyclic terpenes are distinguished from the monocyclic ones in that the cyclo-aliphatic ring of 6 carbon atoms contains one or two bridges which may be valency, methylene or isopropylidene bridges.

In the prior art, the phenols so substituted by terpene radicals are invariably isobornyl groups which belong to the bicyclic terpene radicals. Examples of such stabilizers are isobornyl-ortho-cresol, isobornyl-1,2,4-xylenol, di-isobornyl-para-cresol and di-isobornyl-1,2,4-xylenol.

It is also known that the cresols and xylenols substituted by isobornyl groups are improved as stabilizers for polymers of olefins where used in synergistic combination with substantially involatile organic sulfides, such as, for example, dilauryl-beta-thiodipropionate, didodecyl monosulfide and didodecyl disulfide.

We have found that polymers of ethylenically unsaturated hydrocarbons are stabilized by the addition of cycloalkyl phenols alone or in combination with organic monosulfides; however, better thermal stabilization is desired than is usually obtained with the use of organic monosulfides. We have now discovered that the thermal stabilization of polymers of ethylenically unsaturated hydrocarbons is improved by the addition of such monocyclic aliphatic monophenols in combination with organic polysulfides, and particularly the disulfides.

It is therefore an object of the invention to provide an improved process for the stabilization of polymeric materials. It is another object of the invention to provide an improved process for the stabilization of ethylenically unsaturated hydrocarbons. It is another object to provide an improved process for the stabilization of polymers of olefins. It is a further object to provide stabilized polymeric products. It is a further object to provide polymers of ethylenically unsaturated hydrocarbons which are thermally stable. It is a further object to provide polymers of olefins which have high resistance to thermal degradation. It is a further object to provide polymers of olefins having good mill aging characteristics. It is a further object to provide polymers of olefins having longer oven aging life. It is a further object to provide polymers of olefins with reduced staining and discoloration in UV light. It is still a further object to provide new and improved thermal stabilizers for ethylenically unsaturated hydrocarbons. Other objects and advantages of the invention will become apparent to one skilled in the art from the accompanying disclosure and discussion.

It has been discovered that these and other objects may be accomplished by the process for the stabilization of polymers of ethylenically unsaturated hydrocarbons which comprises the addition of monophenols in which at least two ring carbon atoms are bound to separate hydrocarbons radicals, at least one of these radicals being a monocyclic aliphatic hydrocarbon radical which is bound with a tertiary ring carbon atom to a ring carbon atom of the phenol, in combination with an organic polysulfide.

We have now discovered that the stabilization, particularly thermal stabilization, of polymers of ethylenically unsaturated hydrocarbons, and particularly the polymers of mono-olefins, is improved by the addition of monocyclic aliphatic substituted monophenols in combination with organic polysulfides, and particularly the disulfides.

It has also been found that this process for the stabilization of polymers of ethylenically unsaturated hydrocarbons provides polymers which are thermally stable, have good mill aging characteristics, longer oven aging life, and reduced staining and discoloration in UV light.

The monophenols of the present invention are monophenols of which at least two ring carbon atoms are bound to separate hydrocarbon radicals and in which at least one of these radicals is a cyclo-aliphatic hydrocarbon-radical bound with a tertiary ring carbon atom to a ring carbon atom of the phenol. In this case, the distinguishing feature is, however, that this cyclo-aliphatic hydrocarbon radical is a monocyclic one.

Monophenols are preferably used in which no hydrogen atoms have been substituted in the cycloaliphatic radicals, i.e., in which all ring carbon atoms not bound to the aromatic ring carry two hydrogen atoms.

If desired, one or more of these ring carbon atoms may each be bound to one acyclic hydrocarbon radical, for instance, a short alkyl group having from 1 to 4 carbon atoms or a longer alkyl group. The alkyl groups may be either straight or branched.

Examples of the most attractive monocyclic cyclo-aliphatic hydrocarbon radicals are cyclohexyl, cyclopentyl, and cycloheptyl. One or more of these groups may be readily substituted in alkylated or unalkylated monophenols by alkylation with cyclohexene, cyclopentene and cycloheptene respectively, in the presence of, for instance, BF₃ etherate. Instead of these cyclo-olefins, the corresponding alcohols, for example, cyclo-hexanol, may also be reacted with the monophenols.

Preferred monophenols in which the para position and at least one of the ortho positions with respect to the hydroxyl group are occupied by a hydrocarbon radical. The presence of monocyclic cyclo-aliphatic radicals at the para position and/or at an ortho position and/or at both ortho positions is particularly preferred. Insofar as the hydrocarbon radicals are not cyclo-aliphatic ones, preference is given to acyclic hydrocarbon radicals, especially alkyl groups.

In addition, it is preferred that both the para position and the two ortho positions of the phenol should be occupied by cyclo-aliphatic radicals of the above type. These radicals may be identical or different.

If the para position and the two ortho positions with respect to the hydroxyl group have not all been occupied by cyclo-aliphatic radicals, it is desirable that at least one of these positions should be occupied by a branched acyclic hydrocarbon radical, for instance, branched alkyl groups having from 3 to 25 carbon atoms, such as, for example, isopropyl, tert.butyl, 2-hexyl, 3-nonyl and sec.cetyl.

In such cases where a very slight discoloration of the stabilized polymer is permissible during or after the thermal treatment required in the usual processing techniques, while still primarily desiring an excellent stabilization against thermal degradation, it is desirable that the para position with respect to the hydroxyl group be occupied by a short straight chain hydrocarbon, such as, for example, methyl, ethyl, propyl and the like.

If, however, the color has to conform to the strictest requirements, a phenol is preferably employed in which the para position is occupied by a cyclo-aliphatic radical such as cyclohexyl, cyclopentyl, cycloheptyl, and the like, or a branched alkyl group such as, for example, isopropyl, tert.butyl, 2-hexyl, 3-nonyl, and secondary cetyl.

Examples of the present monophenols are: 2,4,6-tri-cyclohexyl phenol, 2-methyl-4,6-dicyclohexyl phenol, 2-methyl-3,5,6-tricyclohexyl phenol, 4-methyl-2,6-dicyclo-hexyl phenol, 2,4-dimethyl-3,6-dicyclohexyl phenol, 2,6-dimethyl-3,4-dicyclohexyl phenol, 2,4 - dimethyl-6-cyclo-hexyl phenol, 2,6-ditert.butyl-4-cyclohexyl phenol, 2,4,6-tricyclopentyl phenol, 2-methyl-4,6-dicyclopentyl phenol, 2,4-dimethyl - 6 - cyclopentyl phenol, 2,6-ditert.butyl-4-cyclopentyl phenol, 4-methyl-2,6-dicycloheptyl phenol, and 2,4,6-tricycloheptyl phenol.

The monophenols of the present invention may be represented by the structure

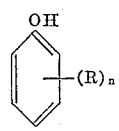

wherein at least one R is a monocyclic aliphatic hydrocarbon radical, and preferably having up to 12 carbon atoms such as, for example, cyclopentyl, cyclohexyl, cycloheptyl, cyclononyl, and the like, and the other R's may be a monocyclic aliphatic hydrocarbon or acyclic hydrocarbon radicals, preferably saturated and having up to 10 carbon atoms, such as, for example, methyl, ethyl, propyl, isopropyl, n-butyl, iso-butyl, nonyl, and the like, and $n$ is an integer of at least 2 and not more than 5.

Preferred monophenols are those wherein at least one R is in the 4 position, and still more preferably in the 2,4 or 2,4,6 positions.

The organic polysulfides used in combination with the monophenols may be of the $R_1$—$S_x$—$R_2$ type, wherein $x$ is a integer greater than 1, and preferably either 2 or 3, and $R_1$ and $R_2$ represent similar or dissimilar hydrocarbon radicals which may be aliphatic, cycloaliphatic or aromatic containing C atoms bound to $S_x$, and preferably having from 1 to 25 carbon atoms, and more preferably more than 3 carbon atoms. Examples of such organic polysulfides include, among others, methyl propyl disulfide, di-isopropyl disulfide, di-isobutyl disulfide, dicetyl disulfide, di-eiscosyl disulfide, and didodecyl disulfide.

Particularly suitable organic sulfides are the compounds in which at least one and preferably both carbon atoms bound to sulfur are aliphatic and which are themselves also bound to an aliphatic carbon atom. Particularly suitable are the sulfides of the

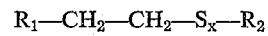

$$R_1—CH_2—CH_2—S_x—R_2$$

type or $R_1$—$CH_2$—$CH_2$—$S_x$—$CH_2$—$CH_2$—$R_2$ type, wherein $x$ is again an integer greater than 1, and preferably 2 or 3, and $R_1$ and $R_2$ represent similar or dissimilar aliphatic, cycloaliphatic or aromatic radicals, having preferably up to 25 carbon atoms, for instance, the higher dialkyl di- and polysulfides, for example n-dodecyl-cetyl disulfide, dicetyl disulfide, di-eicosyl disulfide and didodecyl disulfide.

Thiuram disulfide, particularly the tetra-alkyl derivatives thereof, is suitable as the sulfidic stabilizer component.

Other organic polysulfides which are suitable are the polymeric polythiols which comprise the polythiopoly-mercaptans obtained by treating polymercaptans such as, 1.5-pentanedithiol, 1,4-butanedithiol, 1,4-cyclohexane-dithiol, 1,2,4 - butanetrithiol, dimercapto diethylformal, 1,7 - decanadithiol, 3,3' - thiodipropanethiol, 4,4'-thiodi-hexanethiol, 3,3'-oxydipropanethiol, 4,6-dithio - 1,8 - dec-anedithiol, 4,6 - disulfonyl-1,8-octanedithiol, 4 - hydroxy-1,6-octanedithiol, 1,6-octenedithiol, HSSH, 1,3-benzene-dithiol, 1,3,5-benzenetrithiol, 2-chloro-1,5-benzenedithiol, tetrahydropyran - 2,3 - dipropanethiol, dihydrofuran-2,5-dibutanethiol, sulfolane - 2,5 - dihexanethiol, furan-2,5-di-butanethiol, 3 - hydroxy-dihydropyran-2,5-dioctenethiol, and the like, with agents such as hydrogen peroxide or sodium peroxide. Polymers of the formula $$HS(C_2H_4OCH_2OC_2H_4SS)_nC_2H_4OCH_2OC_2H_4SH$$

may be obtained, for example, by reacting dimercapto diethyl formal with hydrogen peroxide. A more detailed description of the preparation of this type of polymeric organic sulfides may be found in Patrick U.S. 2,466,963.

Still other polymeric organic sulfides which are suitable are those glycols having the general formula

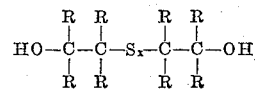

$$HO—\overset{R}{\underset{R}{C}}—\overset{R}{\underset{R}{C}}—S_x—\overset{R}{\underset{R}{C}}—\overset{R}{\underset{R}{C}}—OH$$

where $x$ is an integer from 2 to 6, and R is hydrogen, alkyl, cycloalkyl, aryl or aralkyl radical having preferably up to 25 carbon atoms, and may be the similar or dissimilar. These polysulfides may be prepared by reacting alkaline mono- or polysulfides, such as $Na_2S$, $Na_2S_2$, $Na_2S_4$, as well as, among others, the other alkali, alkaline earth metals and ammonium monosulfides, disulfides and polysulfides, with chlorohydrins, ethylene oxide, propylene oxide, and the like. Dithio diethylene glycol may be prepared, for example, by reacting sodium disulfide with ethylene oxide. A more detailed description of the preparation of this type of polymeric organic sulfides may be found in Bertozi U.S. 2,527,378.

The monophenol stabilizers are employed in a stabilizing amount and preferably from about 0.001% to 5% by weight based on the polymer to be stabilized, and most preferably from about 0.001% to 1%. Likewise, the amount of the organic sulfide stabilizer is employed in a stabilizing amount, and preferably between 0.001% to 5% by weight.

The addition of the stabilizers may be accomplished in various known ways, for example, the stabilizers may be milled into the polymers by the use of heated roll mills or on a Banbury mill. In general, the temperatures used during milling are dependent upon the particular polymer being stabilized.

The temperatures usually employed are from about 140° C. to 200° C. and preferably from about 150° C. to 190° C. The stabilizers may also be added to the final washed polymer slurry prior to drying or they may be added to the powder (fluff) prior to extrusion into nibs. The temperatures employed during the extrusion may be slightly higher than the temperatures employed during milling. The stabilizers can be added during the first stages of work-up, and it is preferable to add at least one or more stabilizers at the earliest possible stage.

If the polymer is separated from the organic diluent used during the polymerization by steam stripping, one or more stabilizers may be added simultaneously with the stem or immediately prior thereto. In certain cases it may be advantageous to use only the most stable stabilizer(s) during the steam treatment and to add the less stable component(s) to the final polymer. If desired, a quantity of one or more stabilizers may be added subsequent to the steam stripping of the final polymer.

Advantages of the invention are illustrated by the following examples. The reactants, and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

EXAMPLE I

This example illustrates the superiority of using a polysulfide over a monosulfide in combination with the monocyclic aliphatic substituted monophenols for the thermal-stabilization of polypropylene.

Stabilization experiments were carried out with a polypropylene prepared with the use of a $TiCl_3$ and aluminum diethyl chloride catalyst, with the $TiCl_3$ being obtained from $TiCl_4$ and triethyl aluminum. The intrinsic viscosity of the polymer as determined in decahydonaphthalene at 135° C. was 2.7.

The polymer powder was intimately mixed and milled at 180° C. with the stabilizer combination consisting of 0.1% of a cycloalkylphenol and 0.25% of either dicetyl monosulfide or dicetyl disulfide based on the polymer. The polymer samples so stabilized were heated in powder form to 167° C. at atmospheric pressure in a reaction vessel filled with oxygen to which an open mercury manometer had been connected. By measuring the oxygen consumption as a function of time, the induction period was determined. Such induction period is the time elapsed between the moment when heating is begun and the moment when oxygen consumption begins to rise rapidly. The results are shown in Table I.

Table I

| Cycloalkyl Phenol | Induction Period in Minutes | |
|---|---|---|
| | Dicetyl Monosulfide | Dicetyl Disulfide |
| 2-Methyl-4,6-dicyclohexylphenol | 4,956 | 5,010 |
| 2-Methyl-4,6-dicyclopentylphenol | 2,900 | 3,070 |
| 2,4,6-tricyclohexylphenol | 4,400 | 4,600 |
| 2,4,6-tricyclopentylphenol | 4,219 | 4,633 |

EXAMPLE II

The procedure shown in Example I is repeated with the exception that the dicetyl disulfide is replaced with equivalent amounts of each of the following: didodecyl disulfide, n-dodecyl-cetyl disulfide, dioctodecyl disulfide, di-eicosyl disulfide. Related results are obtained.

EXAMPLE III

The procedure shown in Example I is repeated with the exception that the dicetyl disulfide is replaced with dithio diethyl glycol. Related results are obtained.

EXAMPLE IV

The procedure of Example I is substantially repeated wherein the dicetyl disulfide is replaced with a polysulfide of the type $$HS(C_2H_4OCH_2OC_2H_4SS)_nC_2H_4OCH_2OC_2H_4SS$$

and having a molecular weight of 3000. Related results are obtained.

I claim as my invention:

1. A composition comprising a polymer of an alpha mono-olefin of from 2 to 4 carbon atoms stabilized with from 0.001 to 5% by weight of said polymer of each of (1) a monophenol selected from the group consisting of 2-methyl-4,6-dicyclohexylphenol and 2,4,6 - tricyclohexylphenol and (2) a dialkyl disulfide wherein the alkyl radicals contain from 12 to 20 carbon atoms.

2. A composition comprising polypropylene stabilized with about 0.1% by weight of polypropylene of 2-methyl - 4,6 - dicyclohexylphenol and about 0.25% by weight of polypropylene of dicetyl disulfide.

3. A composition comprising polypropylene stabilized with about 0.1% by weight of polypropylene of 2,4,6-tricyclohexylphenol and about 0.25% by weight of polypropylene of dicetyl disulfide.

References Cited by the Examiner

UNITED STATES PATENTS

| 2,967,847 | 1/61 | Hawkins et al. | 260—45.7 |
| 2,967,850 | 1/61 | Hawkins et al. | 260—45.7 |
| 2,985,617 | 5/61 | Salyer et al. | 260—45.95 |
| 2,995,539 | 8/61 | Barker et al. | 260—45.95 |
| 3,048,563 | 8/62 | Saydel et al. | 260—45.95 |

FOREIGN PATENTS 1,248,217 10/60 France.

LEON J. BERCOVITZ, *Primary Examiner.*

MILTON STERMAN, *Examiner.*